(12) United States Patent
Moorer et al.

(10) Patent No.: US 7,966,083 B2
(45) Date of Patent: Jun. 21, 2011

(54) AUTOMATION CONTROL SYSTEM HAVING DEVICE SCRIPTING

(75) Inventors: Seale Moorer, Westerville, OH (US); Eric Eichensehr, Westerville, OH (US)

(73) Assignee: Exceptional Innovation LLC, Westerville, OH (US)

( * ) Notice: Subject to any disclaimer, the term of this patent is extended or adjusted under 35 U.S.C. 154(b) by 522 days.

(21) Appl. No.: 11/686,889

(22) Filed: Mar. 15, 2007

(65) Prior Publication Data

US 2007/0225866 A1 Sep. 27, 2007

Related U.S. Application Data

(60) Provisional application No. 60/782,734, filed on Mar. 16, 2006, provisional application No. 60/782,598, filed on Mar. 16, 2006, provisional application No. 60/782,635, filed on Mar. 16, 2006, provisional application No. 60/782,596, filed on Mar. 16, 2006, provisional application No. 60/782,599, filed on Mar. 16, 2006, provisional application No. 60/782,600, filed on Mar. 16, 2006, provisional application No. 60/782,634, filed on Mar. 16, 2006, provisional application No. 60/782,595, filed on Mar. 16, 2006, provisional application No. 60/785,275, filed on Mar. 24, 2006, provisional application No. 60/793,257, filed on Apr. 20, 2006, provisional application No. 60/747,726, filed on May 19, 2006, provisional application No. 60/746,287, filed on May 3, 2006, provisional application No. 60/786,119, filed on Mar. 27, 2006, provisional application No. 60/857,774, filed on Nov. 9, 2006.

(51) Int. Cl.
*G05B 19/00* (2006.01)

(52) U.S. Cl. ............. 700/87; 700/19; 709/203; 709/220
(58) Field of Classification Search ............... 700/9, 17, 700/19, 65, 83, 86, 87, 276, 300; 709/203, 709/220
See application file for complete search history.

(56) References Cited

U.S. PATENT DOCUMENTS

| | | | |
|---|---|---|---|
| 4,567,557 A | 1/1986 | Burns |
| 4,808,841 A | 2/1989 | Ito et al. |
| 4,989,081 A | 1/1991 | Miyagawa |
| 5,086,385 A | 2/1992 | Launey et al. |
| 5,105,186 A | 4/1992 | May |
| 5,218,552 A | 6/1993 | Stirk |
| 5,237,305 A | 8/1993 | Ishijuro |
| 5,282,028 A | 1/1994 | Johnson et al. |
| 5,565,894 A | 10/1996 | Bates et al. |

(Continued)

OTHER PUBLICATIONS

Fred Halsall; Data Communications, Computer Networks and Open Systems; 1996; Addison-Wesley Publishers Ltd.; Fourth Edition; pp. 15-18.

*Primary Examiner* — Charles R Kasenge
(74) *Attorney, Agent, or Firm* — McGuireWoods LLP

(57) ABSTRACT

A process of operating an automation system with an internet protocol based network includes receiving a user input to a client having a user interface implemented with Web Service for Devices (WSD) to initiate a series of scripted automation commands, executing the scripted automation commands by communicating the commands to at least one device implemented with WSD, and performing, with the at least one device, the scripted automation commands. The client is one of a personal computer, a television, a personal digital assistant, and a controller. The device is one of an audio system, a video system, an intercom system, a lighting system, a security system, and a HVAC system.

18 Claims, 10 Drawing Sheets

U.S. PATENT DOCUMENTS

| | | | |
|---|---|---|---|
| 5,579,221 A | 11/1996 | Mun | |
| 5,598,523 A | 1/1997 | Fujita | |
| 5,621,662 A | 4/1997 | Humphries et al. | |
| 5,666,172 A | 9/1997 | Ida et al. | |
| 5,706,191 A | 1/1998 | Bassett et al. | |
| 5,706,290 A | 1/1998 | Shaw et al. | |
| 5,748,444 A | 5/1998 | Honda et al. | |
| 5,787,259 A | 7/1998 | Haroun | |
| 5,850,340 A | 12/1998 | York | |
| 5,877,957 A | 3/1999 | Bennett | |
| 5,922,047 A | 7/1999 | Newlin et al. | |
| 5,956,025 A | 9/1999 | Goulden et al. | |
| 5,956,487 A | 9/1999 | Venkatraman et al. | |
| 6,020,881 A | 2/2000 | Naughton et al. | |
| 6,029,092 A | 2/2000 | Stein | |
| 6,061,602 A | 5/2000 | Meyer | |
| 6,112,127 A | 8/2000 | Bennett | |
| 6,139,177 A | 10/2000 | Venkatraman et al. | |
| 6,147,601 A | 11/2000 | Sandelman et al. | |
| 6,154,681 A | 11/2000 | Drees et al. | |
| 6,160,477 A | 12/2000 | Sandelman et al. | |
| 6,175,872 B1 | 1/2001 | Neumann et al. | |
| 6,182,094 B1 | 1/2001 | Humpleman et al. | |
| 6,192,282 B1 | 2/2001 | Smith et al. | |
| 6,198,479 B1 | 3/2001 | Humpleman et al. | |
| 6,201,523 B1 | 3/2001 | Akiyama et al. | |
| 6,222,729 B1 | 4/2001 | Yoshikawa | |
| 6,243,707 B1 | 6/2001 | Humpleman et al. | |
| 6,263,260 B1 | 7/2001 | Bodmer et al. | |
| 6,268,857 B1 | 7/2001 | Fishkin et al. | |
| 6,275,922 B1 | 8/2001 | Bertsch | |
| 6,278,676 B1 | 8/2001 | Anderson et al. | |
| 6,288,716 B1 | 9/2001 | Humpleman et al. | |
| 6,313,990 B1 | 11/2001 | Cheon | |
| 6,314,326 B1 | 11/2001 | Fuchu | |
| 6,353,853 B1 | 3/2002 | Gravlin | |
| 6,385,495 B1 | 5/2002 | Bennett | |
| 6,389,331 B1 | 5/2002 | Jensen et al. | |
| 6,402,109 B1 | 6/2002 | Dittmer | |
| 6,405,103 B1 | 6/2002 | Ryan et al. | |
| 6,456,892 B1 | 9/2002 | Dara-Abrams et al. | |
| 6,462,654 B1 | 10/2002 | Sandelman et al. | |
| 6,473,661 B1 | 10/2002 | Wollner | |
| 6,496,575 B1 | 12/2002 | Vasell et al. | |
| 6,522,346 B1 | 2/2003 | Meyer | |
| 6,523,696 B1 | 2/2003 | Saito et al. | |
| 6,526,581 B1 | 2/2003 | Edson | |
| 6,546,419 B1 | 4/2003 | Humpleman | |
| 6,580,950 B1 | 6/2003 | Johnson et al. | |
| 6,587,739 B1 | 7/2003 | Abrams et al. | |
| 6,609,038 B1 | 8/2003 | Croswell et al. | |
| 6,615,088 B1 | 9/2003 | Myer et al. | |
| 6,633,781 B1 | 10/2003 | Lee et al. | |
| 6,640,141 B2 | 10/2003 | Bennett | |
| 6,663,781 B1 | 12/2003 | Huling | |
| 6,690,411 B2 | 2/2004 | Naidoo et al. | |
| 6,690,979 B1 | 2/2004 | Smith | |
| 6,735,619 B1 | 5/2004 | Sawada | |
| 6,756,998 B1 | 6/2004 | Bilger | |
| 6,763,040 B1 | 7/2004 | Hite et al. | |
| 6,778,868 B2 | 8/2004 | Imamura et al. | |
| 6,782,294 B2 | 8/2004 | Reich et al. | |
| 6,792,319 B1 | 9/2004 | Bilger | |
| 6,792,323 B2 | 9/2004 | Krzyzanowski et al. | |
| 6,823,223 B2 | 11/2004 | Gonzales et al. | |
| 6,834,208 B2 | 12/2004 | Gonzales et al. | |
| 6,838,978 B2 | 1/2005 | Aizu et al. | |
| 6,845,275 B2 | 1/2005 | Gasiorek et al. | |
| 6,850,149 B2 | 2/2005 | Park | |
| 6,859,669 B2 | 2/2005 | An | |
| 6,865,428 B2 | 3/2005 | Gonzales et al. | |
| 6,868,292 B2 | 3/2005 | Ficco | |
| 6,868,293 B1 | 3/2005 | Schurr et al. | |
| 6,870,555 B2 | 3/2005 | Sekiguchi | |
| 6,891,838 B1 | 5/2005 | Petite | |
| 6,909,921 B1 * | 6/2005 | Bilger | 700/19 |
| 6,912,429 B1 | 6/2005 | Bilger | |
| 6,924,727 B2 | 8/2005 | Nagaoka et al. | |
| 6,928,576 B2 | 8/2005 | Sekiguchi | |
| 6,930,599 B2 | 8/2005 | Naidoo et al. | |
| 6,957,110 B2 | 10/2005 | Wewalaarachchi et al. | |
| 6,957,275 B1 | 10/2005 | Sekiguchi | |
| 6,961,763 B1 | 11/2005 | Wang et al. | |
| 6,965,935 B2 | 11/2005 | Diong | |
| 6,967,565 B2 | 11/2005 | Lingermann | |
| 6,980,868 B2 | 12/2005 | Huang et al. | |
| 6,990,379 B2 | 1/2006 | Gonzales et al. | |
| 7,047,092 B2 | 5/2006 | Wimsatt | |
| 7,130,719 B2 * | 10/2006 | Ehlers et al. | 700/276 |
| 7,136,709 B2 * | 11/2006 | Arling et al. | 700/19 |
| 7,170,422 B2 | 1/2007 | Nelson et al. | |
| 7,174,385 B2 | 2/2007 | Li | |
| 7,200,683 B1 | 4/2007 | Wang et al. | |
| 7,203,486 B2 | 4/2007 | Patel | |
| 7,225,037 B2 * | 5/2007 | Shani | 700/86 |
| 7,260,604 B2 * | 8/2007 | Kuki | 700/83 |
| 7,370,280 B2 | 5/2008 | Ho et al. | |
| 7,380,250 B2 | 5/2008 | Schechter et al. | |
| 7,505,889 B2 | 3/2009 | Salmonsen et al. | |
| 2001/0034754 A1 | 10/2001 | Elwahab et al. | |
| 2001/0036192 A1 | 11/2001 | Chiles et al. | |
| 2001/0039460 A1 | 11/2001 | Aisa | |
| 2002/0000092 A1 | 1/2002 | Sharood et al. | |
| 2002/0016639 A1 | 2/2002 | Smith | |
| 2002/0029085 A1 | 3/2002 | Park | |
| 2002/0031120 A1 | 3/2002 | Rakib | |
| 2002/0033760 A1 | 3/2002 | Kobayashi | |
| 2002/0035404 A1 | 3/2002 | Ficco et al. | |
| 2002/0044042 A1 | 4/2002 | Christensen | |
| 2002/0047774 A1 | 4/2002 | Christensen | |
| 2002/0073183 A1 | 6/2002 | Yoon et al. | |
| 2002/0111698 A1 | 8/2002 | Graziano et al. | |
| 2002/0152311 A1 | 10/2002 | Veltman et al. | |
| 2002/0165953 A1 | 11/2002 | Diong | |
| 2002/0174178 A1 * | 11/2002 | Stawikowski | 700/19 |
| 2002/0180579 A1 | 12/2002 | Nagaoka et al. | |
| 2002/0194328 A1 | 12/2002 | Hallenbeck | |
| 2002/0196158 A1 | 12/2002 | Lee | |
| 2003/0008537 A1 | 1/2003 | Wang | |
| 2003/0009515 A1 | 1/2003 | Lee et al. | |
| 2003/0028270 A1 | 2/2003 | Peterson et al. | |
| 2003/0033028 A1 | 2/2003 | Bennett | |
| 2003/0034898 A1 | 2/2003 | Shamoon | |
| 2003/0037166 A1 | 2/2003 | Ueno et al. | |
| 2003/0040812 A1 | 2/2003 | Gonzales et al. | |
| 2003/0040813 A1 | 2/2003 | Gonzales et al. | |
| 2003/0040819 A1 | 2/2003 | Gonzales | |
| 2003/0065407 A1 | 4/2003 | Johnson et al. | |
| 2003/0069887 A1 | 4/2003 | Lucovsky et al. | |
| 2003/0074088 A1 | 4/2003 | Gonzales | |
| 2003/0083758 A1 | 5/2003 | Williamson | |
| 2003/0101304 A1 | 5/2003 | King et al. | |
| 2003/0103088 A1 | 6/2003 | Dresti et al. | |
| 2003/0198938 A1 | 10/2003 | Murray | |
| 2003/0200009 A1 | 10/2003 | von Kannewurff | |
| 2003/0233432 A1 * | 12/2003 | Davis et al. | 700/276 |
| 2004/0003051 A1 | 1/2004 | Krzyzanowski et al. | |
| 2004/0004810 A1 | 1/2004 | Kim | |
| 2004/0010327 A1 | 1/2004 | Terashima et al. | |
| 2004/0010561 A1 | 1/2004 | Kim | |
| 2004/0039459 A1 | 2/2004 | Daugherty et al. | |
| 2004/0092282 A1 | 5/2004 | Kim et al. | |
| 2004/0133314 A1 | 7/2004 | Ehlers | |
| 2004/0138768 A1 | 7/2004 | Murray | |
| 2004/0143629 A1 | 7/2004 | Bodin et al. | |
| 2004/0176877 A1 | 9/2004 | Hesse | |
| 2004/0213384 A1 | 10/2004 | Alles | |
| 2004/0215694 A1 | 10/2004 | Podolsky | |
| 2004/0215778 A1 | 10/2004 | Hesse et al. | |
| 2004/0215816 A1 | 10/2004 | Hayes et al. | |
| 2004/0237107 A1 | 11/2004 | Staples | |
| 2004/0243257 A1 | 12/2004 | Theimer | |
| 2004/0249922 A1 | 12/2004 | Hackman | |
| 2004/0260407 A1 | 12/2004 | Wimsatt | |
| 2004/0260427 A1 | 12/2004 | Wimsatt | |
| 2004/0266439 A1 | 12/2004 | Lynch et al. | |
| 2004/0267385 A1 | 12/2004 | Lingemann | |

| | | |
|---|---|---|
| 2004/0267876 A1 | 12/2004 | Kakivaya et al. |
| 2004/0267909 A1 | 12/2004 | Autret |
| 2005/0009498 A1 | 1/2005 | Ho |
| 2005/0021805 A1 | 1/2005 | Petris |
| 2005/0035717 A1 | 2/2005 | Adamson |
| 2005/0038708 A1 | 2/2005 | Wu |
| 2005/0044225 A1 | 2/2005 | Ota et al. |
| 2005/0055108 A1 | 3/2005 | Gonzales |
| 2005/0071419 A1 | 3/2005 | Lewontin |
| 2005/0080879 A1 | 4/2005 | Kim et al. |
| 2005/0085930 A1 | 4/2005 | Gonzales |
| 2005/0090915 A1 | 4/2005 | Geiwitz |
| 2005/0096753 A1 | 5/2005 | Arling et al. |
| 2005/0107897 A1 | 5/2005 | Callaghan |
| 2005/0108091 A1 | 5/2005 | Sotak |
| 2005/0113021 A1 | 5/2005 | Gosieski, Jr. et al. |
| 2005/0113943 A1 | 5/2005 | Nian |
| 2005/0119767 A1 | 6/2005 | Kiwimagi et al. |
| 2005/0119793 A1 | 6/2005 | Amundson et al. |
| 2005/0125083 A1 | 6/2005 | Kiko |
| 2005/0131551 A1 | 6/2005 | Ruutu |
| 2005/0131553 A1 | 6/2005 | Yoon et al. |
| 2005/0131558 A1 | 6/2005 | Braithwaite |
| 2005/0132405 A1 | 6/2005 | AbiEzzi |
| 2005/0149758 A1 | 7/2005 | Park |
| 2005/0159823 A1 | 7/2005 | Hayes et al. |
| 2005/0172056 A1 | 8/2005 | Ahn |
| 2005/0198063 A1 | 9/2005 | Thomas et al. |
| 2005/0198188 A1 | 9/2005 | Hickman |
| 2005/0198304 A1 | 9/2005 | Oliver et al. |
| 2005/0232583 A1 | 10/2005 | Kubota |
| 2005/0262227 A1 | 11/2005 | Heller et al. |
| 2005/0267605 A1 | 12/2005 | Lee et al. |
| 2005/0271355 A1 | 12/2005 | Gilor |
| 2006/0004920 A1 | 1/2006 | Hallenbeck |
| 2006/0009861 A1 | 1/2006 | Bonasia et al. |
| 2006/0020353 A1 | 1/2006 | Gonzales et al. |
| 2006/0053234 A1 | 3/2006 | Kumar et al. |
| 2006/0055802 A1 | 3/2006 | He et al. |
| 2006/0058900 A1 | 3/2006 | Johanson et al. |
| 2006/0069934 A1 | 3/2006 | Esch et al. |
| 2006/0106933 A1 | 5/2006 | Huang et al. |
| 2006/0126646 A1 | 6/2006 | Bedingfield, Sr. |
| 2007/0053376 A1 | 3/2007 | Oshima et al. |
| 2007/0073419 A1 * | 3/2007 | Sesay ............................. 700/86 |
| 2007/0083679 A1 | 4/2007 | Kikuchi |
| 2007/0104332 A1 | 5/2007 | Clemens et al. |
| 2007/0162567 A1 | 7/2007 | Ding |
| 2007/0203979 A1 | 8/2007 | Walker |

\* cited by examiner

- Defining Variables – The first section of the scripts establishes variables that the script will use; In thissection, variables are defined by referencing their device category type.

- Associating Variables with Devices – Once you have established variables for the script to use, you need to assign them to a specific device. This is accomplished with this line of code, which includes the friendly name of the device in question.

- Issuing Commands – This final section of the script issues the specific commands to the devices. Commands are executed in the order in which they appear in the script. Pauses can also be inserted to create time between device actions.

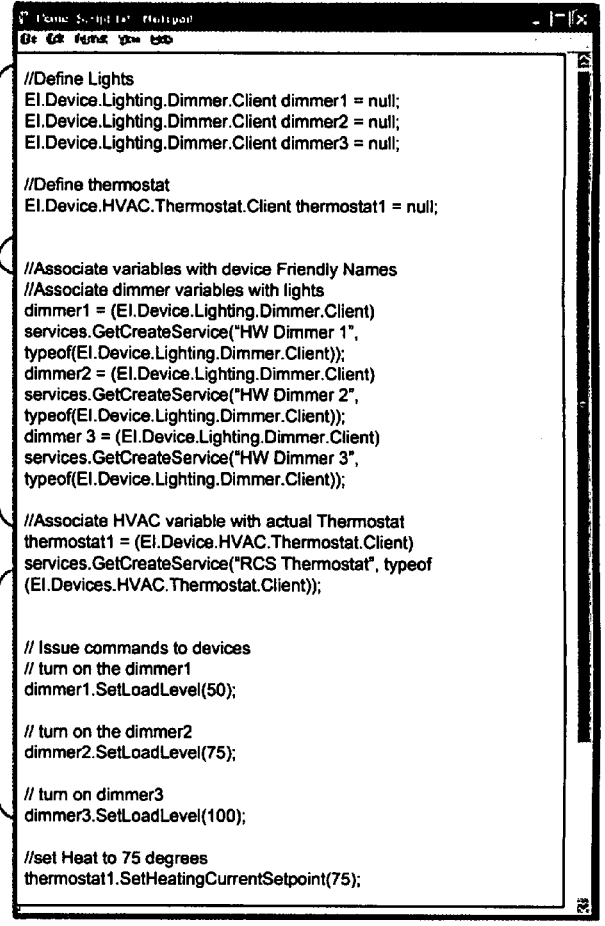

FIGURE 10

AUTOMATION CONTROL SYSTEM HAVING DEVICE SCRIPTING

CROSS REFERENCE TO RELATED APPLICATION

This application claims priority to and the benefit of: Provisional Patent Application No. 60/782,734 filed on Mar. 16, 2006, entitled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTIONS, AND EVENTING THAT IS CONTROLLABLE WITH A TOUCH-SCREEN DISPLAY, to Seale MOORER et al; Provisional Patent Application No. 60/782,596 filed on Mar. 16, 2006, entitled AUTOMATION CONTROL SYSTEM HAVING DIGITAL MEDIA STREAMING, to Seale MOORER et al.; Provisional Patent Application No. 60/782,598 filed on Mar. 16, 2006, entitled AUTOMATION CONTROL SYSTEM HAVING DIGITAL LOGGING, to Seale MOORER et al.; Provisional Patent Application No. 60/782,635 filed on Mar. 16, 2006, entitled AUTOMATION CONTROL SYSTEM HAVING A CONTROL PANEL, to Seale MOORER et al.; Provisional Patent Application No. 60/782,599 filed on Mar. 16, 2006, entitled AUTOMATION CONTROL SYSTEM HAVING A CONFIGURATION TOOL, to Seale MOORER et al.; Provisional Patent Application No. 60/782,600 filed on Mar. 16, 2006, entitled AUTOMATION CONTROL SYSTEM HAVING DEVICE SCRIPTING, to Seale MOORER et al.; Provisional Patent Application No. 60/782,634 filed on Mar. 16, 2006, entitled DEVICE AUTOMATION USING NETWORKED DEVICE CONTROL HAVING A WEB SERVICES FOR DEVICE STACK, to Seale MOORER et al.; Provisional Patent Application No. 60/782,595 filed on Mar. 16, 2006, entitled WIRELESS DIGITAL AMPLIFIER CONFIGURED FOR WALL MOUNTING, SHELF MOUNTING, AND THE LIKE, to Seale MOORER et al.; Provisional Patent Application No. 60/785,275 filed on Mar. 24, 2006, entitled AUTOMATION SYSTEM, to Seale MOORER et al.; Provisional Patent Application No. 60/793,257 filed on Apr. 20, 2006, entitled TOUCH SCREEN FOR USE WITH AUTOMATION SYSTEMS, to Seale MOORER et al.; Provisional Patent application No. 60/747,726 filed on May 19, 2006, entitled COOLING DEVICE FOR A TOUCH SCREEN AND THE LIKE, to Seale MOORER et al.; Provisional Patent Application No. 60/746,287 filed on May 3, 2006, entitled HOME AUTOMATION SYSTEM AND THE LIKE, to Seale MOORER et al.; Provisional Patent Application No. 60/786,119 filed on Mar. 27, 2006, entitled HOME AUTOMATION PROGRAM CODE FOR SET TOP BOX OR SIMILAR CIRCUIT, to Steve CASHMAN; and Provisional Patent Application No. 60/857,774 filed Nov. 9, 2006, entitled PORTABLE MULTI-FUNCTIONAL MEDIA DEVICE, to Seale MOORER et al., all of which are hereby expressly incorporated by reference for all purposes as if fully set forth herein. Further, this application is related to the following U.S. Patent Applications: U.S. patent application Ser. No. 11/686,826, entitled NETWORK BASED DIGITAL ACCESS POINT DEVICE, filed Mar. 14, 2007, to Seale Moorer, et al.; U.S. patent application Ser. No. 11/686,836, entitled INTERNET PROTOCOL BASED MEDIA STREAMING SOLUTION, filed Mar. 15, 2007, to Seale Moorer, et al.; U.S. patent application Ser. No. 11/686,896, entitled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTION, AND EVENTING THAT IS CONTROLLABLE WITH A TOUCH-SCREEN DISPLAY, filed Mar. 15, 2007, to Seale Moorer, et al.; U.S. patent application Ser. No. 11/686,884, entitled AUTOMATION CONTROL SYSTEM HAVING DIGITAL LOGGING, filed Mar. 15, 2007, to Seale Moorer, et al.; U.S. patent application Ser. No. 11/686,893, entitled USER CONTROL INTERFACE FOR CONVERGENCE AND AUTOMATION SYSTEM, filed Mar. 15, 2007, to Seale Moorer, et al.; U.S. patent application Ser. No. 11/686,846, entitled DEVICE AUTOMATION USING NETWORKED DEVICE CONTROL HAVING A WEB SERVICES FOR DEVICES STACK, filed Mar. 15, 2007, to Seale Moorer, et al.; U.S. patent application No. 11/686,875, entitled AUTOMATION CONTROL SYSTEM HAVING A CONFIGURATION TOOL, filed Mar. 15, 2007, to Seale Moorer, et al.; which are all hereby expressly incorporated by reference for all purposes as if fully set forth herein.

BACKGROUND OF THE INVENTION

1. Field of the Invention

The invention is directed to an automation convergence system having scripted control of devices, and more particularly to a user control interface allowing generation of scripts for scripted control of devices in an automation convergence system.

2. Related Art

Household, academic facility and/or business spaces now more commonly have more than one audio or video device such as CD/DVD player, portable MP3 player, tuner, preamp, power amp, speakers, VCR, DVR, computers running media players or connected to some other source of audio or video (e.g., Internet radio, satellite radio and the like), etc. Typically, a CD/DVD player from one company comes with its own remote control and an amplifier by an entirely different company comes with its own remote control. The same space may have a PC with its keyboard and mouse, and yet another company's portable MP3 player with its own control switches. While each audio device is doing precisely what it was designed to do, each operates completely independent from the others with the possible exception of the portable MP3 player that may be connected to a PC for synchronization. As a result, a user ends up going from one keypad to another or juggling a series of remote controls in order to control the devices.

Since these audio/video and similar devices are not designed to communicate with each other or their communication is very limited, access to these audio/video devices is limited by their physical locations. For example, it is difficult to play an MP3 file saved in a PC hard disk drive in one room or area (a child's bedroom) on speakers located in another room or area (an entertainment room). Thus, in order for a user to enjoy music of his or her choice whenever and wherever he or she wants, each room needs to be equipped with all the necessary audio/video equipment and digital audio/video content.

Also, the audio/video devices are not designed to communicate with other home devices (e.g., TV, lighting, security system, etc.). Thus, it is difficult, if not impossible, to converge the devices for common control for certain occasions. For example, in order to watch a movie, the user must turn on a TV, a DVD player and an audio amplifier by using three different remote controls. Then the user must set the TV to receive a video signal from the DVD player, set the audio amplifier to receive an audio signal from the DVD player and use another control unit to adjust the lighting of the room. Even when a user utilizes universal remote, as is known in the art, the result is a plurality of devices that are separately operated and are operated separately from a single universal remote for each and every action that the device must execute. These devices do not converge as described above. Moreover, the devices lack any ability to operate in a controlled manner to execute multiple actions in response to a single user request.

Accordingly, there is a need for a solution for the aforementioned accessibility, connectability, controllability and convergence issues for controlled multiple action operation of devices.

SUMMARY OF THE INVENTION

In one aspect of the invention, a process of operating an automation system including an internet protocol based network includes receiving a user input to a client having a user interface implemented with Web Service for Devices (WSD) to initiate a series of scripted automation commands, executing the scripted automation commands by communicating the commands to at least one device implemented with WSD, and performing, with the at least one device, the scripted automation commands.

The at least one client may include at least one of a personal computer, a television, a personal digital assistant, and a controller. The at least one device may include at least one of an audio system, a video system, an intercom system, a lighting system, a security system, and a HVAC system.

According to another aspect of the invention, an automation system including an internet protocol based network includes a client having a user interface configured to receive a user input to initiate a series of scripted automation commands, at least one device to perform the scripted automation commands, and an internet protocol network to communicate the scripted automation commands to the at least one device.

The at least one client may include at least one of a personal computer, a television, a personal digital assistant, and a controller. The at least one device may include at least one of an audio system, a video system, an intercom system, a lighting system, a security system, and a HVAC system.

In yet another aspect of the invention, a machine-readable medium including instructions, which, when executed by a processor cause the processor to operate an automation system, includes instructions for receiving a user input to a client having a user interface implemented with WSD to initiate a series of scripted automation commands, instructions for executing the scripted automation commands by communicating the commands to at least one device implemented with WSD, and instructions for performing, with the at least one device, the scripted automation commands.

The at least one client may include at least one of a personal computer, a television, a personal digital assistant, and a controller. The at least one device may include at least one of an audio system, a video system, an intercom system, a lighting system, a security system, and a HVAC system.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings:

FIG. 10 shows the various commands of the exemplary script file.

DETAILED DESCRIPTION OF THE INVENTION

Figure 1:
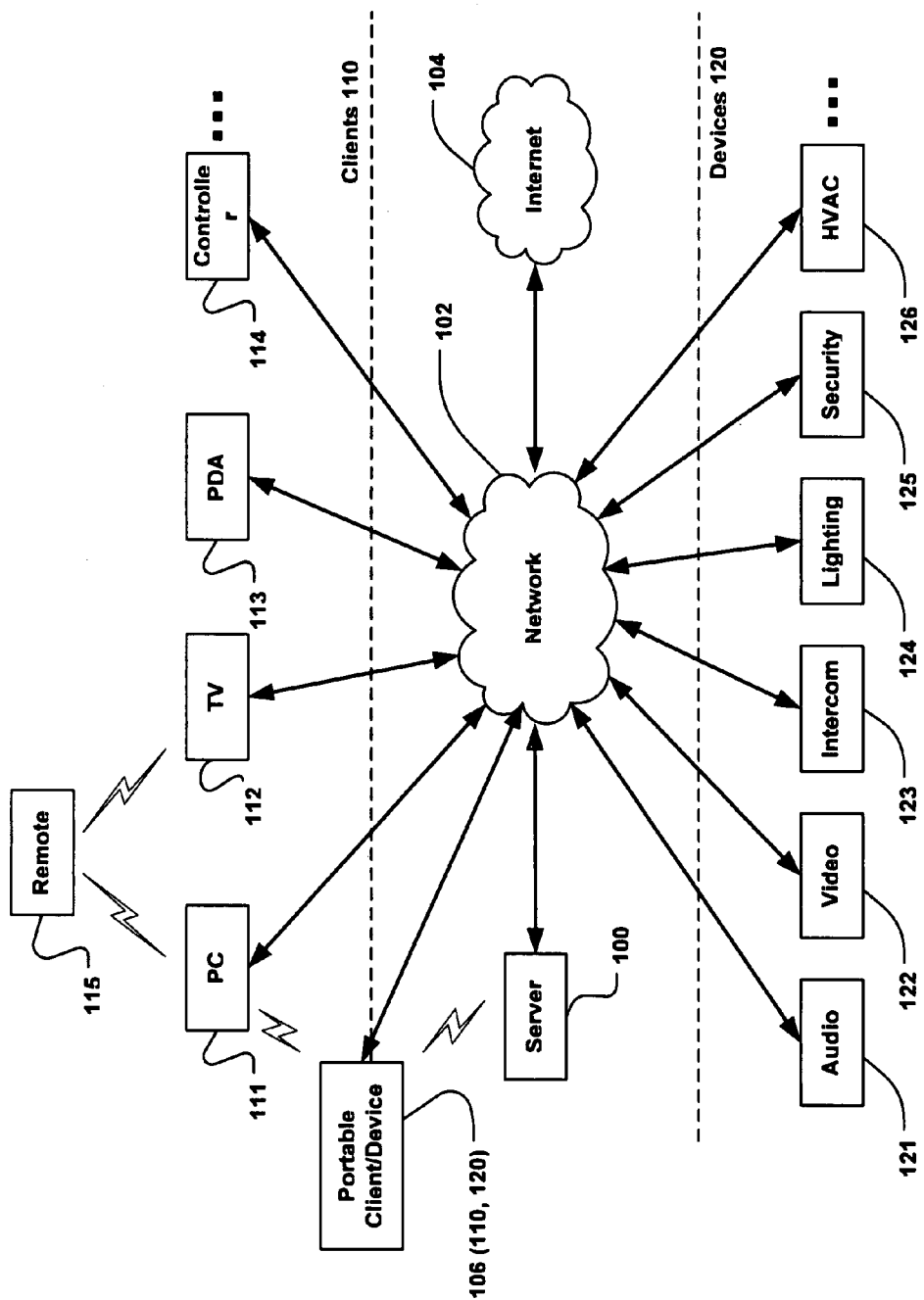
FIG. 1 shows an overview of an automation convergence system constructed according to the principles of the invention.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

FIG. 1 shows an overview of a convergence and automation system (CAS) for use with a portable remote control, communications and media consumption device constructed according to the principles of the invention. The CAS solution may be a combination of hardware and software. The hardware may include a server 100 connected to a network 102 (e.g. IP based wired or wireless network such as an Ethernet network) and may possibly be connected to the internet 104, devices 120 (e.g. audio 121, video 122, intercom 123, lighting 124, security system 125, HVAC 126, and the like) and clients 110 (e.g. TV 112, personal computer (PC) 111, personal digital assistant (PDA) 113, controller 114 such as a control panel, game controller (i.e. XBox™, not shown) and the like). Moreover, the clients 110 may include a remote control 115 or a portable device 106 for remote control, communications and media consumption, which may be configured to function as both the client and device. The server 100 may be any type of computer, such as a PC connected to the network 102. The clients 110 such as clients 111, 112, 113, 114 provide a user with control over the devices 120 such as devices 121, 122, 123, 124, 125, 126.

The software (i.e. application) enables the hardware devices 120 and/or clients 110 to communicate with each other despite their different proprietary languages and communication protocols, and may provide the user with control over most or all the hardware from a single client. The application may utilize at least one portion of the hardware to send commands to the devices 120 and receive feedback from them. The application integrates centralized device control into a PC based media environment (e.g., Microsoft Windows XP Media Center™ or Microsoft Windows Vista™ environment or any equipment or future counterpart) that may store, organize and play digital media content. The user may use the remote control 115 or the portable device 106 to listen to music, watch and record television, enjoy family photographs and home movies, as well as adjust the lighting, secure the home, adjust the temperature, distribute music throughout the house, check surveillance cameras and the like. Moreover, the portable device 106 has further communication features as noted below.

The application maximizes flexibility and scalability with an elegant n-tiered, service oriented architecture that allows loosely coupled components to easily interact with each other across the network. In particular the application may be created using Microsoft™ .NET framework and coded primarily in C#. The application accordingly embraces the tremendous benefits of web services for the control of the devices. The Web Services use standard Internet protocol (IP) and are based on standard XML-related technologies such as SOAP (Simple Object Access Protocol) for communications and WSDL (Web Services Device Language) to describe interfaces. The devices implemented with Web Service for Device (WSD) become black boxes on the network, providing services to any application, on any platform, written in any language. Moreover, the use of WSD allows for the capabilities of Universal Plug and Play (UPnP) that seamlessly connects and simplifies implementation as is known in the art.

The invention may include a user interface for configuring CAS to maximize its convergence and automation capabilities to provide serial command to the various devices 120 shown in FIG. 1 through the use of the automation control script. In particular the application of the invention allows for the use of a script to command the various devices 120. The script of the invention allows a user to string together a series of commands that control the multiple devices 120 in specific ways. For example a script command such as "good morning" script may raise the shades on the windows, disarm the security system, bring up the lights throughout the rooms throughout a home, and begin playing music through an audio system.

The invention further allows for the generation of various scripts for command and control of devices 120 in response to a user operating or executing a script in one of the clients 110. The scripts may be generated a number of different ways, the invention as described in greater detail below shows a first way of generating scripts in conjunction with FIGS. 3 to 8 through various graphical user interfaces and a script engine.

Figure 9:
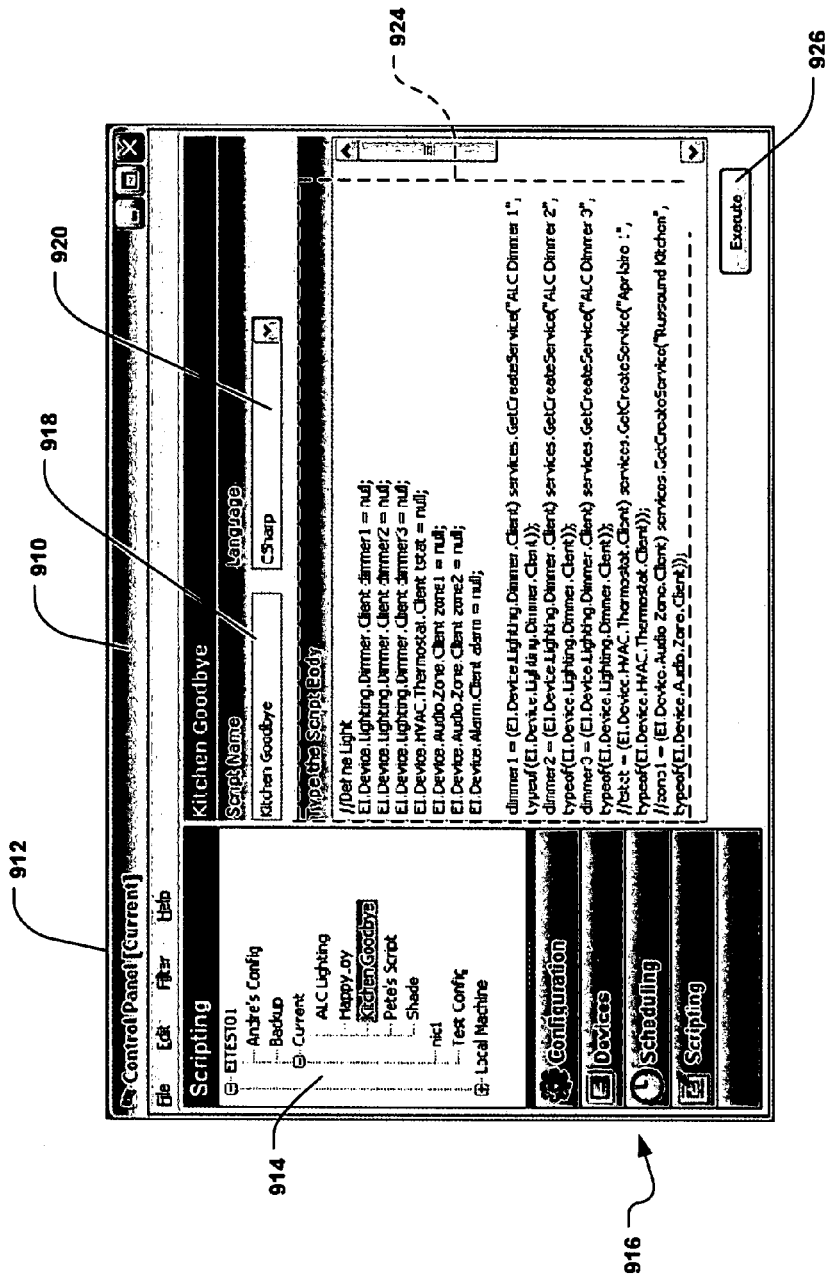
FIG. 9 shows a screen capture image of a control panel for configuring a convergence and automation system (CAS), constructed according to the principles of the invention.

The invention also discloses a manner in which to generate script commands through the use of inputting various hand-coded script commands using known computer languages as shown in FIGS. 9 and 10.

Figure 2:
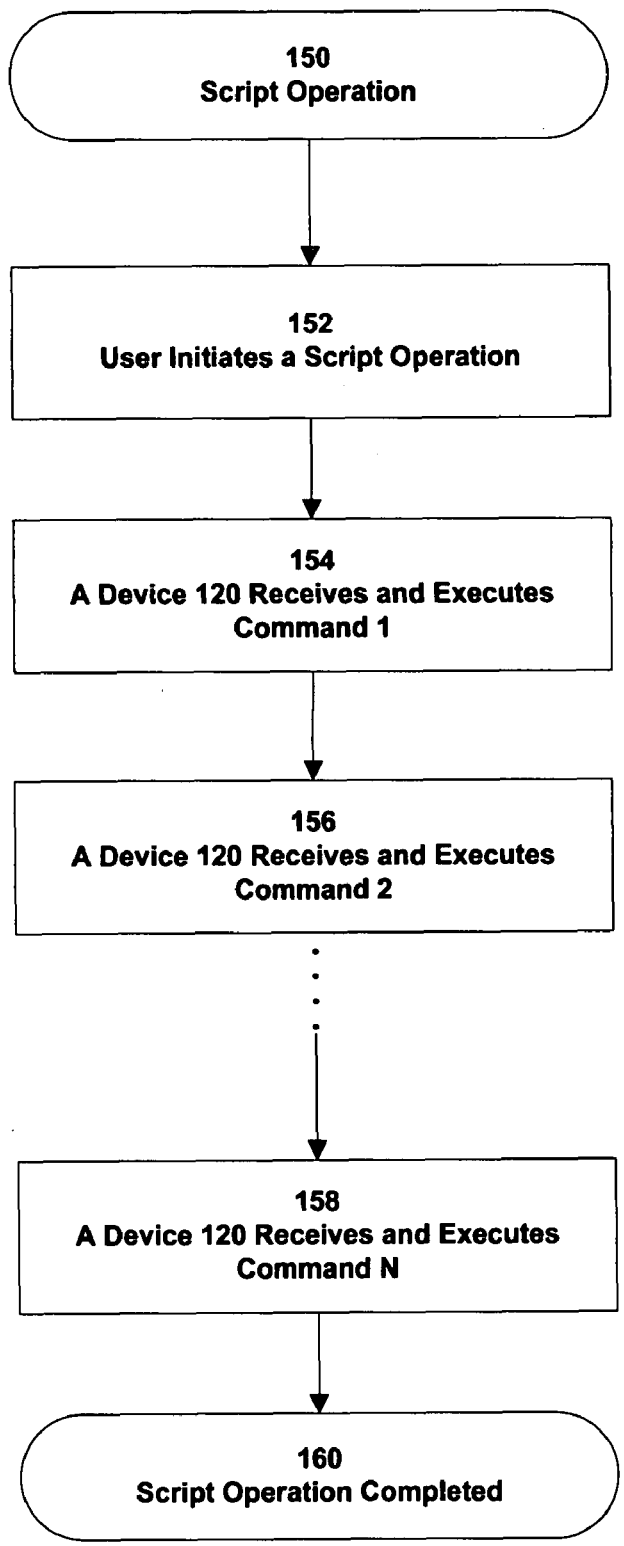
FIG. 2 shows a schematic of the operation of scripts operating according the principles of the invention.

In particular FIG. 2 shows the script operation 150 used in conjunction with the convergence system of FIG. 1. Initially a user inputs a command to execute a script 152 with one of the clients 110 shown in FIG. 1. This may be accomplished using a single command or action that results in a plurality of actions by the devices. The client 110 in conjunction with server 100 or the server 100 may implement the script that is generated as described below. As shown in box 154, a device 120 as shown in FIG. 1 may receive and execute a command 1. Thereafter as shown in step 156, a device 120 may receive and execute a command 2. This process may continue any number of times as designated in the script. In particular as shown in reference numeral 158 another device 120 may receive and execute a command N, where N is any number. Thereafter as shown in oval 160, the script operation may be concluded.

Figure 3:
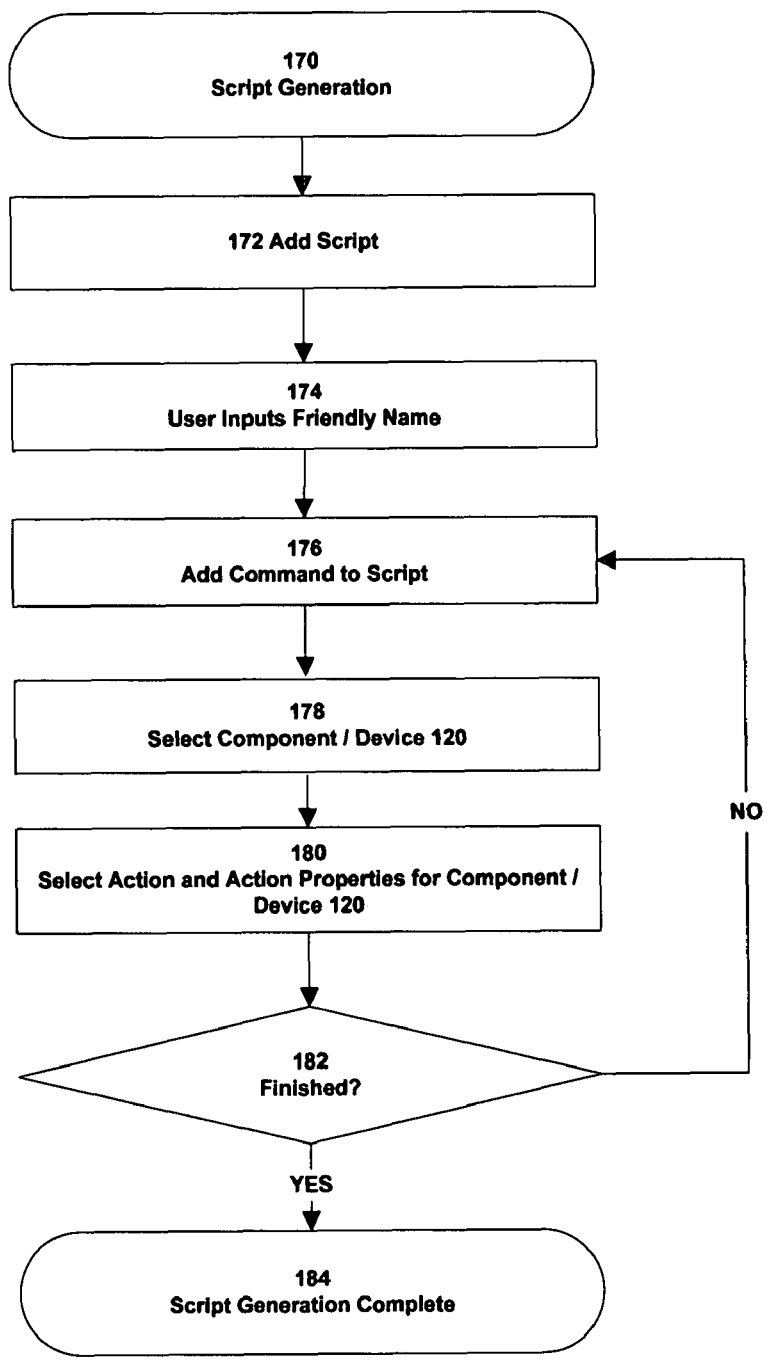
FIG. 3 shows a schematic of the generation of a script command operating according the principles of the invention.

FIG. 3 shows a schematic of the generation of the script command constructed according the principles of the invention. As shown in FIG. 3, a script generation process 170 is shown. As shown in box 172, a user may first add a script process to the system to be implemented by one of the clients 110, the server 100, or both. Once the user decides to add a script, they may provide a user friendly name as shown in box 174. This user friendly name may allow the user to become more easily familiar with what components, devices or clients are being actuated by execution of the script. Next as shown in box 176, the user may add a command for the script to implement with respect to one of the devices 120. Next as shown in reference number 178, the user may choose a component or device 120 in which the command may be directed. Next the user may select an action and an action property to be associated with the command and to be associated with the component or device 120 as shown in step 180. Once the particular portion of the script has been completed as shown in 180 the user may then be finished or may add another command to the script. This is shown by the logic 182 that allows the user to add further commands or to move on to the script completion oval 184.

In accordance with the invention, creating a script involves creating commands for the various devices to operate. These commands may be a combination of an action and any action properties that must be included with the action. Accordingly, the commands may be generated from the various clients 110 and/or the server 100 shown in FIG. 1. These commands may be sent through the network 102 to the various devices 120 to operate as noted above. Accordingly a user may go to the controller 114 shown in FIG. 1 and designate the "Good Morning" script to be operated. Accordingly the controller may communicate through the network 102 and possibly through server 100 to issue the various script commands to the various devices 120 to provide the aforementioned operation with respect to the shades, security alarm, lights, and audio system.

Figure 4:
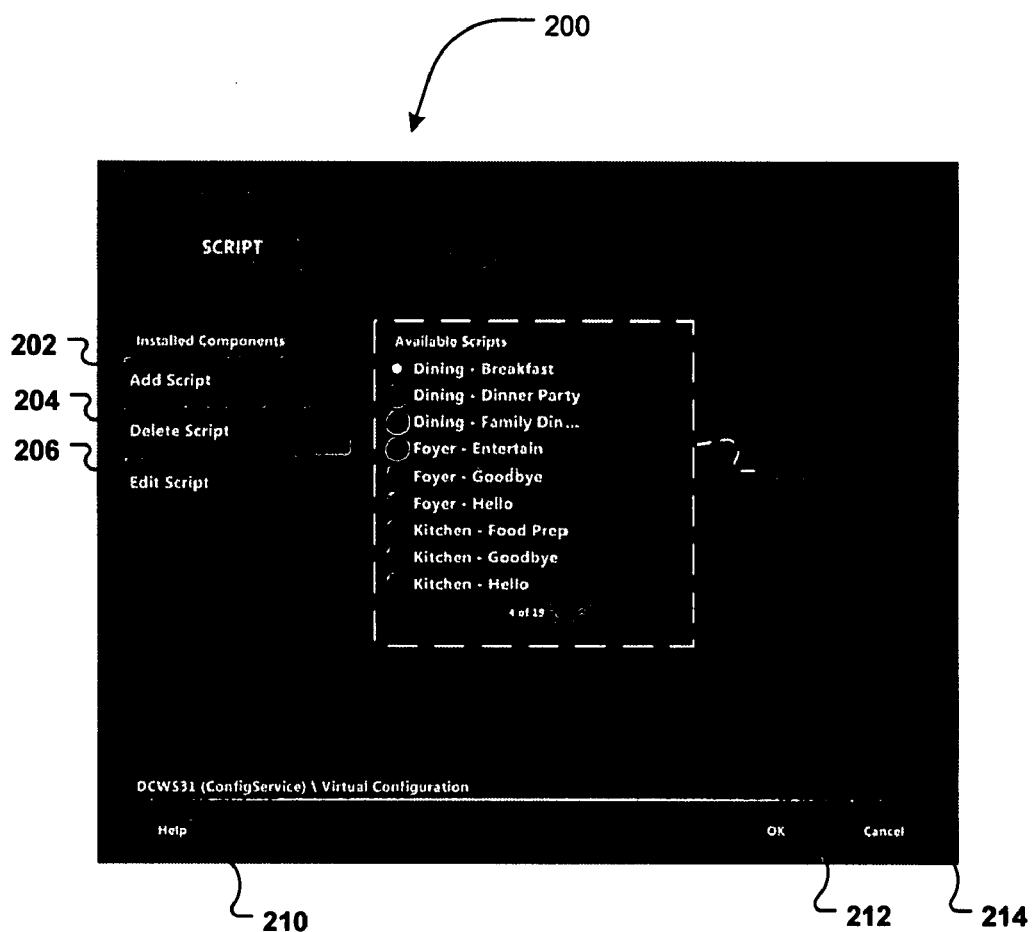
FIG. 4 shows a screen capture image of a script setup graphical user interface constructed according to the principles of invention.

FIG. 4 is a screen capture of the script setup graphical user interface constructed according to the principles of the invention. The script setup graphical user interface 200 may include any number of buttons or features. In the exemplary setup shown in FIG. 4, the script setup graphical user interface 200 may be implemented as shown on any one of the clients 110 shown in FIG. 1. An exemplary embodiment of the script setup graphical user interface 200 may be implemented on a touch screen display rendering a series of buttons that are sensitive to the touch of a user. Further in FIG. 4, the script setup graphical user interface 200 may include an add script button 202. A user may press the add script button 202 in order to create a new script for creating commands to operate the various devices 120 shown in FIG. 1. Further shown in the script setup graphical user interface 200 is a delete script button 204. The delete script button 204 may be used to delete any number of already created scripts. Also shown in the script setup graphical user interface 200 is an edit script button 206. The edit script button 206 may be used to select an edit various scripts that have already been generated. As shown by dotted lines in Section 208, the script setup graphical user interface lists available scripts that have already been created. The delete script button 204 and edit script button 206 may be selected in order to delete or edit the available scripts shown by reference number 208. Also shown in script setup graphical user interface 200 is a help button 210, OK button 212, and a cancel button 214. Each of buttons 210, 212, and 214 providing known help, selection, and cancellation operations as is well known in the art. Accordingly, the script setup graphical user interface 200 provides a very user friendly interface for adding, deleting, and editing scripts for control of various devices 120 by clients 110 shown in FIG. 1.

Once a user decides to add a script by selection of button 202 in the script setup graphical user interface 200, the script setup graphical user interface 200 may be replaced by a script command graphical user interface which is described in more detail below. Of course it should be noted that the various features shown in the script setup graphical user interface 200 may be arranged in a different manner and may include more or less features.

Figure 5:
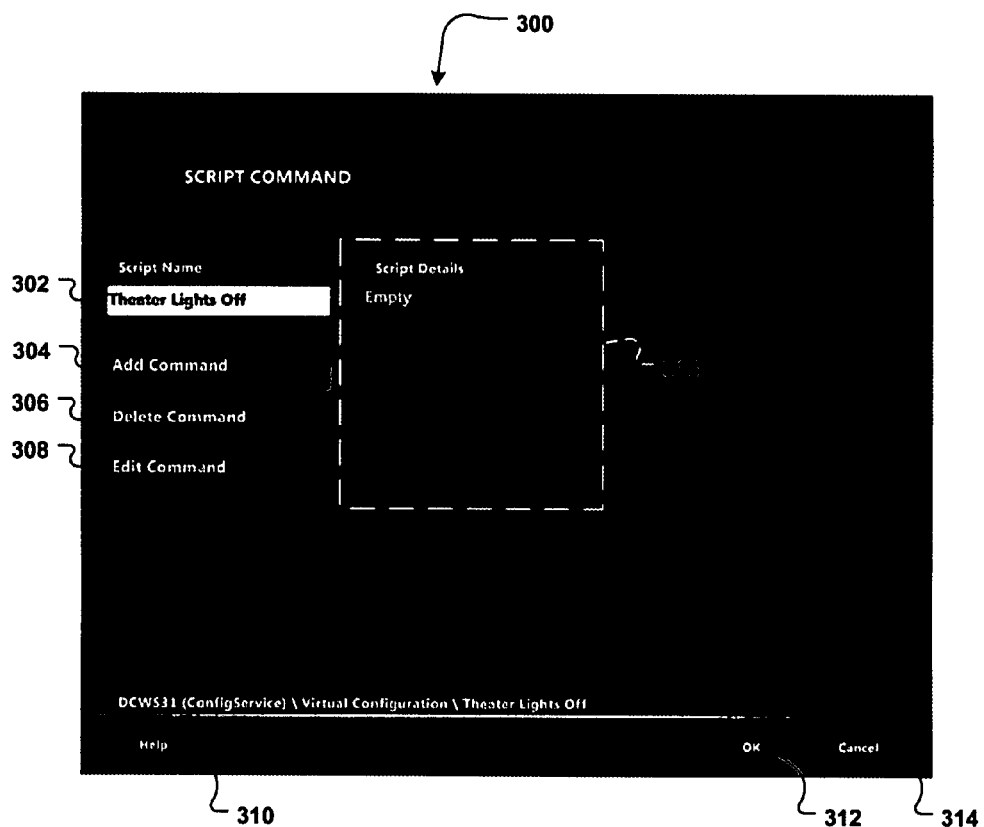
FIG. 5 shows a screen capture image of a script command graphical user interface constructed according to the principles of the invention.

FIG. 5 shows a screen capture of a script command graphical user interface 300 constructed according to the principles of the invention. The script command graphical user interface 300 may be displayed to a user in response to the user selecting the add script button 202 or the edit script button 208 in the script setup graphical user interface 200 shown in FIG. 4. If the add script button 202 was selected in the script setup graphical user interface 200 shown in FIG. 4 then the user may be prompted to create and input a script name (not shown). If the user had selected the edit script button 206 from the script setup graphical user interface 200 shown in FIG. 4, then the user may then be prompted to select one of the available scripts shown in for example box 208 shown in FIG. 4. As shown in FIG. 5, the script command graphical user interface 300 includes a display of the script name 302, along with the script details 316. The script command graphical user interface 300 also may include an add command button 304, a delete command button 306, and an edit command button 308. The add command button 304 may be selected by the user when the user desires to add a particular command to the script that they are creating or editing. The delete command button 306 may be selected by a user when they want to delete one of a plurality of script commands that are currently provisioned by a particular script. Finally, the user may select the edit command button 308 in order to select a particular command and modify the various features thereof. Similar to the script setup graphical user interface 200, the script command graphical user interface may also include a help button 310, an OK button 312, and a cancel button 314 providing functionality as is well known in the art. It should be further noted that the script command graphical user interface 300 may include more or less features then that shown in FIG. 5.

In response to the user selecting the add command button 304 shown in the script command graphical user interface 300, the display of client 110 may show the user a list of components for which the user may select in order to generate a command for (not shown). Thereafter the user may select one of the components from the listing of components and the client 110 may render an action setup graphical user interface 400 as described below.

Figure 6:
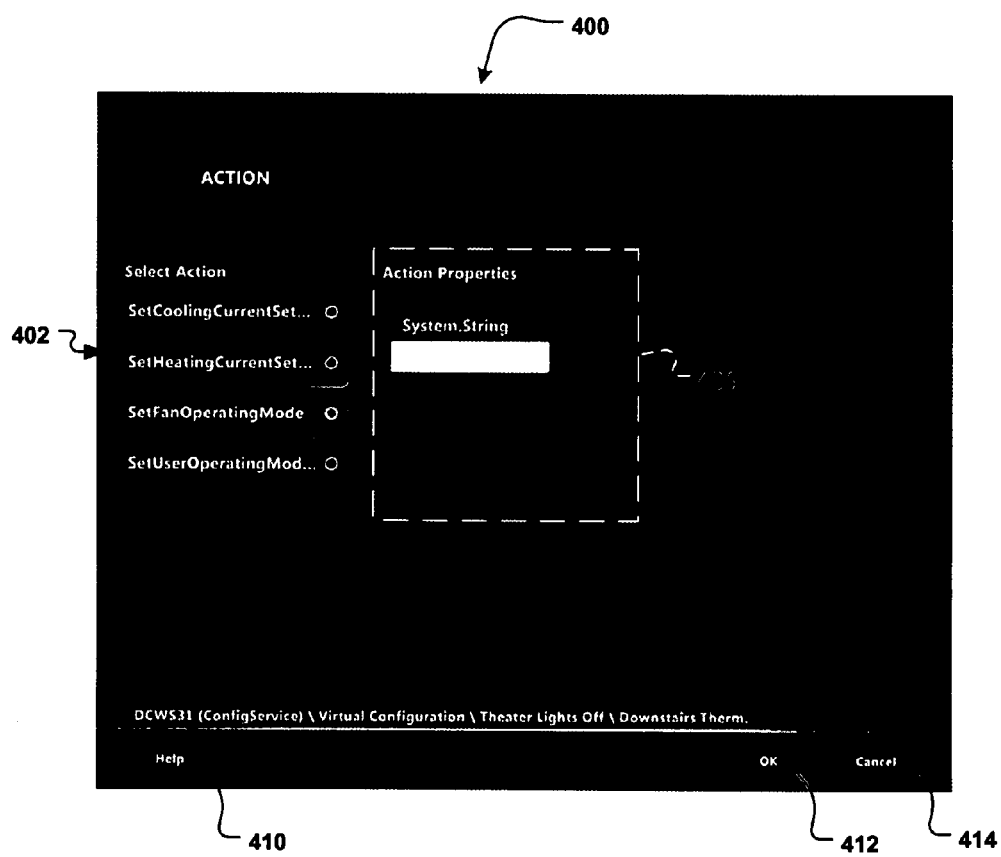
FIG. 6 shows a screen capture of an action setup graphical user interface constructed according to the principles of the invention.

FIG. 6 shows an action setup graphical user interface constructed according to principles of the invention. In particular the action setup graphical user interface 400 includes a select action portion 402 that is associated with the component selected by the user. In this case the user selected and HVAC system. Accordingly the select action screen 402 automatically determines and shows a plurality of actions that may be selected by the user to generate a command for a HVAC system. Upon selection of one of the select actions 402 shown in FIG. 6, a screen may be provided in the display of the action setup graphical user interface 400 to provide an input for action properties 404. The action properties 404 portion may allow for a system string to be inserted to provide the various action properties for the selected action 402. In this portion of the script setup, a command may be created, which is as noted above, an action and an action property. The action being the "select action" shown as buttons in 402 and the action property being shown by the system setting 404 box. As shown in table 1 below, a number of access and action properties may be associated with a particular task.

TABLE 1

| Task | Action | Action Properties |
| --- | --- | --- |
| Turn on a dimmer to a specific percentage | SetLoadLevel | 0-100: Percentage at which you want the dimmer set. 100 is fully on; 0 is fully off. |
| Turn on a switch on or off | SetSwitchLevel | Set to True to turn switch on. False to turn switch off. |
| Press push button | PressPushButton | None. |
| Arm the alarm | Arm | pin - PIN number set for this alarm. Type - type of arming; possible values are: AWAY - Arms everything. STAY - Arms perimeter, leaves interiors unarmed. NIGHT - (Honeywell only) Arms perimeter and some interior alarms. Disarm the alarm Disarm pin - PIN number set for this alarm. Mute an audio zone Mute True to mute, False to unmute |
| Open/Close a shade | SetShadeTarget or SetShadePosition | Number between 0-100. 100 is fully open, 0 is fully closed. |

For example as shown in the first row of Table 1, in order to turn on a dimmer light to a particular percentage, the action may be to set the load level of electricity going to the light and the action property may be a percentage from 0 to 100 percent. Further tasks, actions, and action properties are noted in Table 1. However, it should be noted that other types of tasks, actions, and action properties are within the scope of the invention and contemplated herewith.

Figure 7:
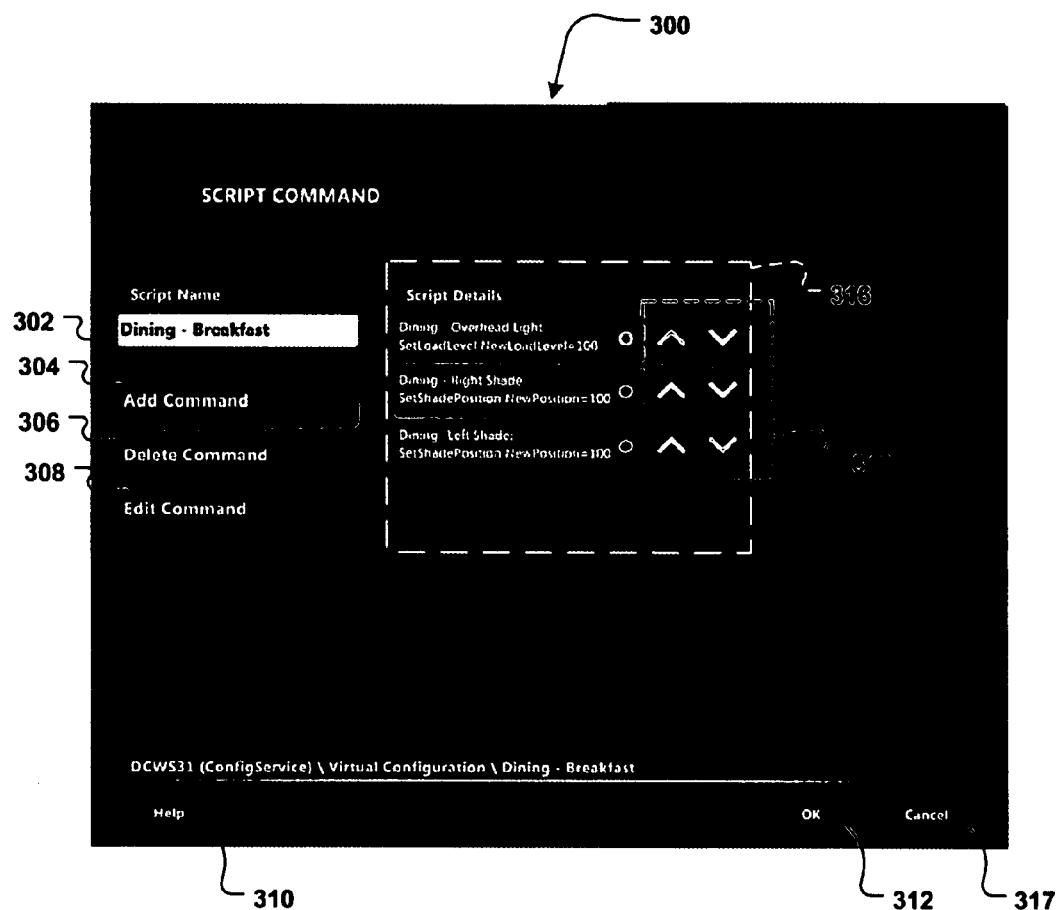
FIG. 7 shows another screen capture image of a script setup graphical user interface of FIG. 4 having script details already added.

Accordingly, as noted above a single command has been generated for a script to be operated in response to a script command. This process may be repeated a number of times in order to string a series of commands together. For example as shown in FIG. 7, the script command graphical user interface is shown with script details 316 showing three different script commands that have been strung together. These script commands may be operated in any particular order, the order of which may be changed by depressing the position changing buttons 318 to the right thereof. Of course any type of arrangements of buttons is within the scope and spirit of the invention.

Figure 8:
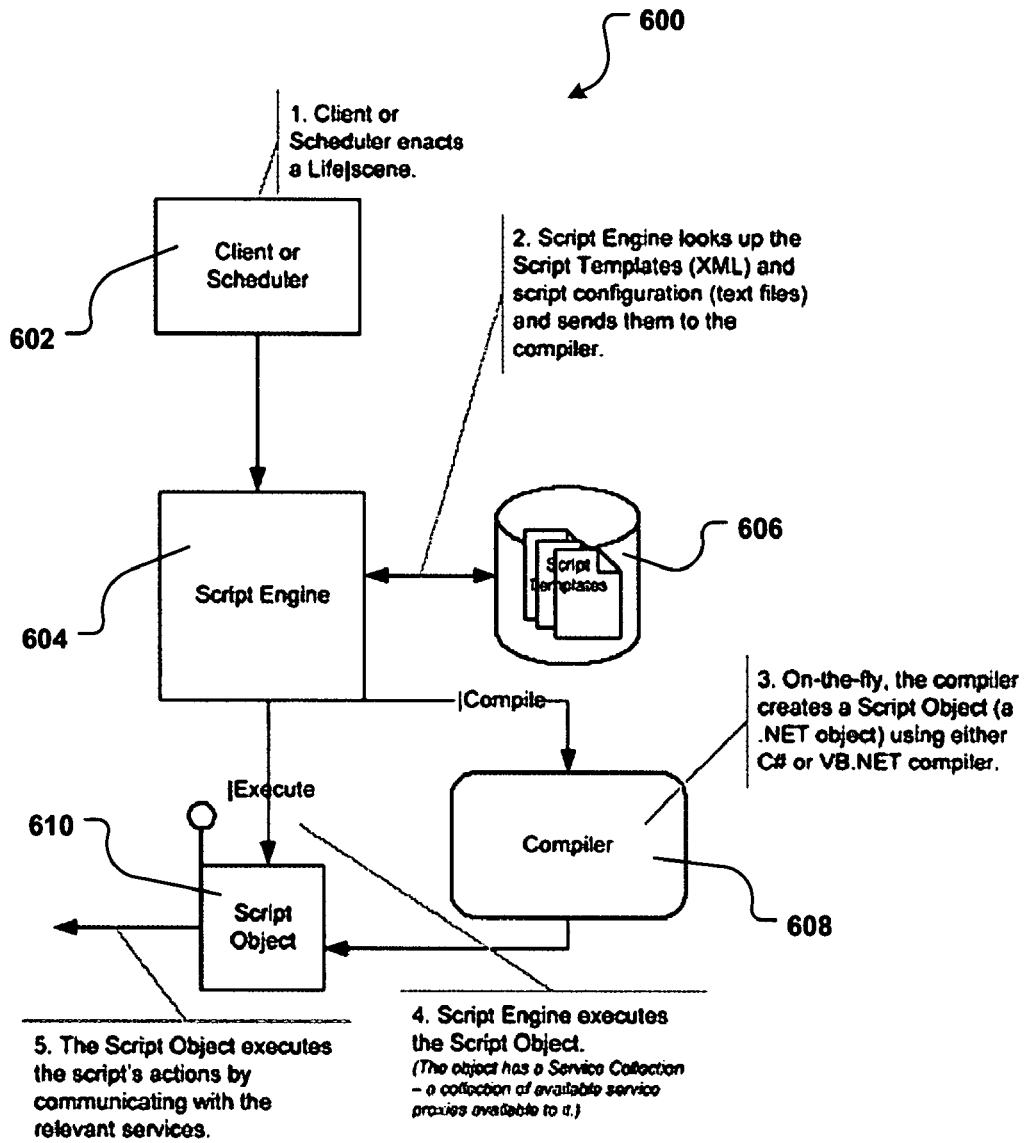
FIG. 8 shows a schematic of a script engine constructed according to the principles of the invention.

FIG. 8 shows a schematic of a script engine constructed according to the principles of the invention. In particular, the script engine 600 may be used in conjunction with the various processes and graphical user interface displays of FIGS. 2 to 7. The script engine 600 may be implemented in the server 100, any one or more of the clients 110 or both. The script engine 600 is the portion of the application responsible for the generation of a script object that may execute the actions called for in the series of script commands. When a user creates a script, as noted above, the script engine 600 may create the script object by compiling the script on the fly into a .NET object (a script object). Thereafter the script engine 600 may execute the script object in order to perform the action configured for the specific script as noted above. Creation of the script object on the fly allows changes to the configuration of the scripts to be made quickly and implemented immediately without a time consuming restarting of services. The script engine 600 may be configured to easily communicate with the various remote web services implemented in the devices 120.

The script engine 600 may be implemented such that a client or scheduler 602 may allow a user to enact the script as was noted above or in some other known manner. Thereafter, a script engine 604 may then look up various script templates (XML) and script configurations (text files) from a database 606 or the like. Thereafter the script engine 604 may send them to a compiler 608. The compiler 608 may then, on the fly, compile and create a script object 610 which may be a .NET object. This script object 610 may be created using C# or a VB.NET compilation. Once the script object 610 has been created, the script engine 604 may then execute the script object in order to create the script actions.

FIG. 9 shows an exemplary user interface configuration window 910, which will be referred to as a control panel, constructed according to the principles of the invention. The control panel 910 of the invention may be integrated with the control panel of a Windows™ operating system. As commonly known, the control panel application may be started by opening Windows Explorer™, navigating to the applications folder in the automation convergence folder on the local drive, and double-clicking the corresponding executable file or program (e.g., controlpanel.exe). The user may navigate the control panel 610 using a mouse, keyboard, input device, or the like. As shown in FIG. 9, the control panel 910 of the invention may include several elements such as a menu bar 912, navigation pane 914, functional area pane 916, script name pane 918, script language pane 920, script body text input portion 924 and the like that provides script control of all of the devices and clients.

The menu bar 912 may provide menus for the control panel 910, such as "File" (i.e., save, save all, and/or exit functions and/or the like). "Edit" (i.e. new configuration, new component, new device, new schedule, new script and/or delete functions and/or the like), "View" (i.e., servers function and/or the like), "help" (i.e. about function and/or the like). The navigation pane 914 may contain configurations, devices, schedules and/or scripts and/or the like in a tree view. As well known, if a navigation item has a plus (+) sign next to it, the user may click the item to view additional sub items. If a navigation item has a minus (−) sign next to it, the user may click the item to hide the additional sub items.

The functional area pane 916 may contain several buttons for "Configuration," "Devices," "Scheduling," "Scripting," "Triggers," "Templates," and/or the like. The "Configuration" button allows the user to add and edit configurations on servers. The "Devices" button allows the user to view original manufacturer information, test devices, and control devices. The "Scheduling" button allows the user to set up schedules to run scripts. The "Scripting" button which allows the user to create and edit scripts for running components and devices. The "Triggers" button allows the user to identify a specific device status and condition as a trigger to automatically execute a script when it occurs. The "Templates" button allows the user to add control for certain non-certified devices (CD players, DVD players, audio receivers, displays, and so on).

The control panel 910 shown in FIG. 9 is shown rendering the scripting input window in response to pressing the scripting button in the functional area pane 916. Pressing the scripting button in the functional area pane 916 may present the user with a choice of script names in window 918. By selecting one of the script names in script name window 918 may bring up the scripted body text input portion 924 and the script language pane 920. Accordingly, a user may then input a script commands in the script body text input portion 924 and select a language in language selection pane 920. After inserting the script name in box 918 the script language in 920, and the script body text in box 924 user then may execute the script by pressing execute button 926.

Accordingly the scripts generated with respect to the control panel in FIG. 9 may be hand-coded scripts created in any number of languages including C# programming language.

FIG. 10 shows an exemplary script command language coded according to the principles of the invention for use in the control panel 910. In particular FIG. 10 shows three different parts to each script that is hand-coded in conjunction with the implementation of scripts shown in FIG. 10. In particular, the upper portion of the script is used for defining various variables. This portion of the script establsihes the variables that the script may use. In particular, this section may allow variable to be defined by referencing their device category type. Next, the center section of code may allow for the association of variables with the various devices 120. In this regard, once the variables have been established for the script use, they need to be assigned to a specific device 120. This is accomplished in this section of code which may include a friendly name of the device that is going to be operated. The bottom section of the script command includes issuing commands. Commands are executed in the order in which they appear in the script. Additionally, pauses may be inserted into the commands to create time between various device actions.

Accordingly, the invention as described above includes the implantation of the strings of commands known as scripts to be used in an automation system as set forth in FIG. 1. The scripts may provide operation consistent with that of FIG. 2 and may be generated consistent with that of FIG. 3. Generation of the script may be implemented through the graphical user interfaces shown in FIGS. 4-7 and moreover may be complied in a script engine as show in FIG. 8. Alternatively, the script may be created in the interface shown in FIG. 9 having exemplary text such as shown in FIG. 10. These scripts may be implemented in an automation system such as that shown in FIG. 1 or the like.

The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instuctions may be used in implementing the methodologies described herein. For example, software codes may be stored in a memory, for example the memory of client or device, and executed by a processor, for example a general-purpose processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

While the invention has been described in terms of exemplary embodiments, those skilled in the art will recognize that the invention can be practiced with modifications in the spirit and scope of the appended claims. These examples given above are merely illustrative and are not meant to be an exhaustive list of possible designs, embodiments, applications or modifications of the invention.

What is claimed is:

1. A process of operating an automation system comprising a plurality of devices, each device configured to perform at least one action, and a client for controlling the actions of the plurality of devices, the plurality of devices and the client connected to an Internet Protocol (IP) based network implemented with a Web Service for Devices (WSD) protocol by a server connected thereto, the method comprising:
    rendering a script setup interface to at least one of the server and the client for allowing a user to add, delete and edit a script comprising a series of commands for automating and converging the actions of the plurality of devices;
    rendering a configuration interface to at least one of the server and the client for allowing the user to create and edit a script by hand-coding and set up a schedule to run a script and a trigger condition for automatically executing a script;
    rendering a user interface in at least one of the server and the client to receive a user input to execute the script; and
    upon receiving the user input, distributing the series of commands of the script to the plurality of devices through the network to automate and converge the actions of the plurality of devices,
    wherein the WSD protocol comprises:
        a first communication layer configured to logically interface the client;
        a second communication layer configured to physically interface the plurality of devices; and
        a service provider layer comprising one or more components, each component corresponding to a device category, wherein each component comprises:
            one or more Web Services corresponding to one or more of the plurality of devices of the corresponding device category, respectively, each Web Service configured to function as a Web Service host for the corresponding one or more of the plurality of devices;
            one or more device bridges corresponding to the one or more Web Services, respectively, each device bridge configured to translate communication between the corresponding Web Service and device; and
            a controller configured to communicate with the one or more of the plurality of devices of the corresponding device category.

2. The process according to claim 1, wherein the user input comprises a single user input.

3. The process according to claim 1, wherein the script setup interface and configuration interface are a graphical user interface.

4. The process according to claim 1, wherein each command controls an action for a particular device to take and a property of the action.

5. The process according to claim 1, wherein the step of rendering the script setup interface comprises the step of rendering a script command interface for at least one of implementing functionality for adding a device command, deleting a device command, and editing a device command and listing current commands.

6. The process according to claim 5, wherein the step of rendering the script setup interface further comprises the step of rendering an action setup interface for selecting an action for a particular device for inputting action properties associated with the action.

7. An automation system comprising:
    a server connected to an Internet Protocol (IP) based network to implement a Web Service for Device (WSD) protocol thereto;
    a plurality of devices connected to the network, each device configured to perform at least one action;
    a client connected to the network and having a user interface to receive a user input to execute a script comprising a series of commands for automating and converging the actions of the plurality of devices,
    wherein the server is configured to render a script setup interface and a configuration interface to at least one of the server and the client,
    the script setup interface allows a user to add, edit and delete a script, and
    the configuration interface allows the user to create and edit a script by hand-coding and set up a schedule to run a script and a trigger condition for automatically executing a script,
    wherein the WSD protocol comprises:
        a first communication layer configured to logically interface the client;
        a second communication layer configured to physically interface the plurality of devices; and
        a service provider layer comprising one or more components, each component corresponding to a device category, wherein each component comprises:
            one or more Web Services corresponding to one or more of the plurality of devices of the corresponding device category, respectively, each Web Service configured to function as a Web Service host for the corresponding one or more of the plurality of devices;
            one or more device bridges corresponding to the one or more Web Services, respectively, each device bridge configured to translate communication between the corresponding Web Service and device; and
            a controller configured to communicate with the one or more of the plurality of devices of the corresponding device category.

8. The automation system according to claim 7, wherein the user input comprises a single user input.

9. The automation system according to claim 7, wherein the script setup interface and the configuration interface are a graphical user interface.

10. The automation system according to claim 7, wherein each command controls an action for a particular device to take and a property of the action.

11. The automation system according to claim 7, wherein the script setup interface comprises a script command interface for at least one of implementing functionality for adding a device command, deleting a device command, and editing a device command and listing current commands.

12. The automation system according to claim 11, wherein the script setup interface further comprises an action setup interface for selecting an action for a particular device for inputting action properties associated with the action.

13. A machine-readable medium comprising instructions, which, when executed by a processor cause the processor to operate an automation system comprising a server, a plurality of devices, each configured to perform at least one action, and a client configured to control the actions of the plurality of devices, the server, the plurality of devices and the client connected to an Internet Protocol (IP) based network implemented with a Web Service for Devices (WSD) protocol by the server, the machine-readable medium comprising:

instructions for rendering a script setup interface for adding, deleting and editing a script comprising a series of commands for automating and converging the actions of the plurality of devices;

instructions for rendering a configuration interface for allowing the user to create and edit a script by hand-coding and set up a schedule to run a script and a trigger condition for automatically executing a script;

instructions for rendering a user interface to at least one of the server and the client for receiving a user input to execute the script; and instructions for, upon receiving the user input, distributing the series of commands of the script to the plurality of devices via the network to automate and converge the actions of the plurality of devices, wherein the WSD protocol comprises:

a first communication layer configured to logically interface the client;

a second communication layer configured to physically interface the plurality of devices; and a service provider layer comprising one or more components, each component corresponding to a device category, wherein each component comprises:

one or more Web Services corresponding to one or more of the plurality of devices of the corresponding device category, respectively, each Web Service configured to function as a Web Service host for the corresponding one or more of the plurality of devices;

one or more device bridges corresponding to the one or more Web Services, respectively, each device bridge configured to translate communication between the corresponding Web Service and device; and a controller configured to communicate with the one or more of the plurality of devices of the corresponding device category.

14. The machine-readable medium according to claim 13, wherein the user input comprises a single user input.

15. The machine-readable medium according to claim 13, wherein the script setup interface and the configuration interface are a graphical user interface.

16. The machine-readable medium according to claim 13, wherein each command controls an action for a particular device to take and a property of the action.

17. The machine-readable medium according to claim 13, wherein the instructions for rendering the script setup interface comprises instructions for rendering a script command interface for at least one of implementing functionality for adding a device command, deleting a device command, and editing a device command and listing current commands.

18. The machine-readable medium according to claim 17, wherein the instructions for rendering the script setup interface further comprises instructions for rendering an action setup interface for selecting an action for a particular device for inputting action properties associated with the action.

* * * * *